United States Patent
Kikukawa (10) Patent No.: US 9,952,370 B2
(45) Date of Patent: Apr. 24, 2018

(54) LONG STRETCHED FILM AND PRODUCTION METHOD THEREFOR

(71) Applicant: ZEON CORPORATION, Tokyo (JP)

(72) Inventor: Masaru Kikukawa, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/030,480

(22) PCT Filed: Oct. 29, 2014

(86) PCT No.: PCT/JP2014/078778
§ 371 (c)(1),
(2) Date: Apr. 19, 2016

(87) PCT Pub. No.: WO2015/064645
PCT Pub. Date: May 7, 2015

(65) Prior Publication Data
US 2016/0259106 A1 Sep. 8, 2016

(30) Foreign Application Priority Data
Oct. 30, 2013 (JP) .................................. 2013-225560

(51) Int. Cl.
*G02B 5/30* (2006.01)
*B29C 55/16* (2006.01)
(Continued)

(52) U.S. Cl.
CPC ............ *G02B 5/3083* (2013.01); *B29C 55/16* (2013.01); *G02B 5/3033* (2013.01);
(Continued)

(58) Field of Classification Search
CPC ..... G02B 5/3083; B29C 55/045; B29C 55/16; B29C 55/20
(Continued)

(56) References Cited

U.S. PATENT DOCUMENTS 5,173,239 A * 12/1992 Gunter, Jr. .............. B29C 55/20
26/71
8,097,200 B2 1/2012 Asada
(Continued)

FOREIGN PATENT DOCUMENTS

JP 2003-340917 A 12/2003
JP 2012-150513 * 8/2012
(Continued)

OTHER PUBLICATIONS

Jan. 27, 2015 Written Opinion issued in International Patent Application No. PCT/JP2014/078778.
(Continued)

*Primary Examiner* — Ricky D Shafer
(74) *Attorney, Agent, or Firm* — Oliff PLC (57) ABSTRACT

A method for manufacturing a stretched film for producing a long-length stretched film by stretching a long-length resin film while being conveyed so as to pass through an oven in a state in which the end portions of the resin film are held by first and second grippers, wherein the oven has a preliminary heating zone, a stretching zone, a thermal fixing zone, and a reheating zone in this order from an upstream side; the stretching zone includes a specific zone having a temperature gradient capable of setting a temperature of an end portion on a second gripper side is higher than a temperature of an end portion on a first gripper side by 5° C. or higher and 15° C. or lower; and the reheating zone has a temperature capable of heating the resin film to a temperature of Tg+5° C. or higher and Tg+20° C. or lower.

10 Claims, 3 Drawing Sheets

(51) Int. Cl.
  *G02F 1/13363* (2006.01)
  *B29D 11/00* (2006.01)
  *B29K 1/00* (2006.01)
  *B29K 23/00* (2006.01)
  *B29K 69/00* (2006.01)
  *B29L 31/34* (2006.01)

(52) U.S. Cl.
  CPC .. *G02F 1/133634* (2013.01); *B29D 11/00644* (2013.01); *B29K 2001/08* (2013.01); *B29K 2023/38* (2013.01); *B29K 2069/00* (2013.01); *B29L 2031/3475* (2013.01)

(58) Field of Classification Search
  USPC ............................ 359/489.01, 489.07, 900
  See application file for complete search history.

(56) References Cited

U.S. PATENT DOCUMENTS

| | | | |
|---|---|---|---|
| 9,186,837 B2 | 11/2015 | Hojo et al. | |
| 9,389,352 B2* | 7/2016 | Iida | B29C 55/08 |
| 9,394,415 B2* | 7/2016 | Hojo | B29D 11/00644 |
| 9,482,802 B2* | 11/2016 | Sase | G02B 5/3083 |
| 2007/0084542 A1* | 4/2007 | Montagna | B29C 51/02 |
| | | | 156/160 |
| 2007/0134446 A1* | 6/2007 | Inagaki | B29C 41/28 |
| | | | 428/1.31 |
| 2010/0255220 A1* | 10/2010 | Asada | B29C 55/045 |
| | | | 428/1.3 |
| 2014/0333872 A1* | 11/2014 | Sato | G02B 5/3083 |
| | | | 349/62 |
| 2015/0048540 A1 | 2/2015 | Hatakeyama et al. | |
| 2016/0318233 A1* | 11/2016 | Kobayashi | B29C 55/14 |

FOREIGN PATENT DOCUMENTS

| | | |
|---|---|---|
| JP | 5083483 B1 | 11/2012 |
| JP | 5177332 B1 | 4/2013 |
| JP | 2013-193226 A | 9/2013 |
| JP | 2013-195939 A | 9/2013 |
| JP | 5565281 B2 | 8/2014 |
| WO | 2009/041273 A1 | 4/2009 |

OTHER PUBLICATIONS

Jan. 27, 2015 International Search Report issued in International Patent Application No. PCT/JP2014/078778.

* cited by examiner

LONG STRETCHED FILM AND PRODUCTION METHOD THEREFOR

FIELD

The present invention relates to a long-length stretched film and a method for manufacturing a long-length stretched film.

BACKGROUND

In liquid crystal display devices, an optical member such as a phase difference film is used for improving performance. When a phase difference film is used, for example, for antireflection of mobile devices, organic EL televisions and the like, as well as optical compensation of liquid crystal display devices, a slow axis of the phase difference film needs to be inclined at an angle neither in parallel nor perpendicular with respect to a transmission axis of a polarizer. On the other hand, a transmission axis of a polarizer is usually in parallel to a long-side direction or a short-side direction of a rectangular display surface of devices. Thus, a rectangular phase difference film having a slow axis in a diagonal direction with respect to a side thereof is demanded.

A phase difference film has hitherto been produced by longitudinal stretching or lateral stretching of a long-length pre-stretch film. In this description, longitudinal stretching refers to stretching of a long-length film in the lengthwise direction thereof, while lateral stretching refers to stretching of a long-length film in the width direction thereof. For obtaining a rectangular phase difference film having a slow axis in a diagonal direction from such a long-length film, the film needs to be diagonally cut out such that the side is inclined in a diagonal direction with respect to the width direction of the long-length film. However, with such a production method, the amount of disposed film increases and production of a film by a roll-to-roll process becomes difficult, and thus production efficiency is decreased. For addressing to this issue and improving production efficiency, it has been proposed to perform stretching of a long-length pre-stretch film in a diagonal direction (See Patent Literatures 1 to 4).

CITATION LIST

Patent Literature

Patent Literature 1: Japanese Patent No. 5177332 B
Patent Literature 2: Japanese Patent No. 5083483 B
Patent Literature 3: Japanese Patent Application Laid-Open No. 2012-103651 A
Patent Literature 4: International Publication No. 2009/041273

SUMMARY

Technical Problem

When a stretched film is produced by stretching a long-length pre-stretch film in a diagonal direction, a tenter device having a pair of grippers capable of holding both end portions in the width direction of the pre-stretch film is usually used. In the stretching process using such a tenter device, the grippers hold the both end portions in the width direction of the pre-stretch film and then the pre-stretch film is stretched while being conveyed.

When stretching in a diagonal direction is performed using such a tenter device, the diagonal stretching of the pre-stretch film is usually performed in a manner such that the grippers holding one end portion of the pre-stretch film precedes the grippers holding the other end portion of the pre-stretch film. As such, in general, the pre-stretch film is conveyed by the tenter device so as to be bent toward one side in the width direction.

When the stretched film was produced by stretching in a diagonal direction in this manner using the tenter device, slack was sometimes generated at one edge portion in the width direction of the stretched film. Specifically, when the film was conveyed by the tenter device in a bending manner, slack was sometimes generated at the edge portion of the stretched film corresponding to the inside of the bending portion. When slack occurs in this manner, there is concern that conveying property of the stretched film is decreased.

The present invention has been made in view of the above-mentioned problems and it is an object of the present invention to provide: a method for manufacturing a long-length stretched film having no slack at an edge portion in the width direction and having a slow axis in a diagonal direction with respect to the width direction; and a long-length stretched film having no slack at an edge portion in the width direction and having a slow axis in a diagonal direction with respect to the width direction.

Solution to Problem

The inventor of the present invention has conducted extensive studies in order to solve the above-mentioned problems. As a result, the inventor has found out that slack that has hitherto occurred at an edge portion of a long-length diagonally-stretched film can be suppressed by, during a stretching process in a diagonal direction, setting a specific temperature gradient along the width direction of the film during stretching, and performing a reheating process in a specific temperature range to the film obtained after stretching, in combination. Thus, the inventor has completed the present invention.

That is, the present invention is as follows.

(1) A method for manufacturing a stretched film for producing a long-length stretched film having a slow axis in an angle of 5° or more and 85° or less on average with respect to a width direction thereof by stretching a long-length resin film while being conveyed so as to pass through an oven in a state in which each of both end portions of the resin film are held by first grippers and second grippers that are capable of holding the end portions of the resin film, wherein:

the oven has a preliminary heating zone, a stretching zone, a thermal fixing zone, and a reheating zone in this order from an upstream side;

the stretching zone includes a specific zone having a temperature gradient capable of setting a temperature of an intermediate area such that a temperature of an end portion on a second gripper side therein is higher than a temperature of an end portion on a first gripper side therein by 5° C. or higher and 15° C. or lower, the intermediate area being an area of the resin film in the width direction excluding the both end portions thereof; and the reheating zone has a temperature capable of heating the resin film to a temperature of Tg+5° C. or higher and Tg+20° C. or lower (Tg representing a glass transition temperature of a resin forming the resin film), the manufacturing method comprising:

a step of holding the both end portions of the resin film by the first grippers and the second grippers;

a step of passing the resin film through the preliminary heating zone;

a step of passing the resin film through the stretching zone such that a moving distance of the first grippers is longer than a moving distance of the second grippers;

a step of passing the resin film through the thermal fixing zone; and a step of passing the resin film through the reheating zone.

(2) The method for manufacturing a stretched film according to (1), wherein a stretch ratio is 1.1 times or more and 3.0 times or less.

(3) The method for manufacturing a stretched film according to (1) or (2), wherein, in the intermediate area of the resin film in the specific zone, the temperature of the end portion on the first gripper side and the temperature of the end portion on the second gripper side are both Tg+13° C. or higher and Tg+30° C. or lower.

(4) The method for manufacturing a stretched film according to any one of (1) to (3), wherein the stretched film has the slow axis in an angle of 40° or more and 50° or less on average with respect to the width direction of the stretched film.

(5) The method for manufacturing a stretched film according to any one of (1) to (4), wherein a width of the stretched film is 1300 mm or more and 1500 mm or less.

(6) The method for manufacturing a stretched film according to any one of (1) to (5), wherein a thickness of the stretched film is 10 μm or more and 100 μm or less.

(7) The method for manufacturing a stretched film according to any one of (1) to (6), wherein the stretched film is made of a thermoplastic resin.

(8) A long-length stretched film produced by the manufacturing method according to any one of (1) to (7).

(9) A long-length stretched film having a slow axis in an angle of 5° or more and 85° or less on average with respect to a width direction thereof, wherein a length ratio of both edge portions in the width direction is 0.9975 to 1.0025.

(10) The long-length stretched film according to (8) or (9), wherein an average NZ coefficient is 1.08 to 1.3.

(11) The long-length stretched film according to any one of (8) to (10), wherein the long-length stretched film is a uniaxially stretched film.

Advantageous Effects of Invention

According to the method for manufacturing a stretched film of the present invention, a long-length stretched film having no slack at an edge portion in the width direction and having a slow axis in a diagonal direction with respect to the width direction can be produced.

The long-length stretched film of the present invention does not have slack at an edge portion in the width direction and has a slow axis in a diagonal direction with respect to the width direction.

DESCRIPTION OF EMBODIMENTS

Hereinafter, the present invention will be described in details by showing embodiments and examples. However, the present invention is not limited to the embodiments and the examples described below and may be optionally changed for implementation without departing from the scope of claims of the present invention and equivalents thereto.

In the following description, the term "long-length" refers to those having a length of at least 5 times or more, preferably 10 times or more, the width length thereof, and specifically refers to those having a length enough to be stored or transported in the form of a roll.

Further, in the following description, an in-plane retardation of the film is a value represented by (nx−ny)×d, unless otherwise specified. Further, an NZ coefficient is a value represented by (nx−nz)/(nx−ny), unless otherwise specified. In the formulae, nx represents a refractive index in a direction which gives the maximum refractive index among directions perpendicular to a thickness direction of the film (in-plane direction), while ny represents a refractive index in an in-plane direction perpendicular to the direction of nx. nz represents a refractive index in the thickness direction of the film. d represents the thickness of the film. The measurement wavelength is set to 590 nm, unless otherwise specified.

Further, in the following description, "(meth)acrylate" includes both "acrylate" and "methacrylate". "(meth)acrylic" includes both "acrylic" and "methacrylic". Further "(meth)acrylonitrile" includes both "acrylonitrile" and "methacrylonitrile".

Further, in the following description, directions of elements being "parallel", "perpendicular", and "orthogonal" may allow errors within a range of not impairing the effect of the present invention, for example, within a range of ±5°, unless otherwise specified.

Further, in the following description, an MD direction (machine direction) refers to a flow direction of the film in a production line and is usually parallel to the lengthwise direction and the longitudinal direction of the long-length film.

Further, in the following description, a TD (transverse direction) refers to a direction parallel to a film plane, perpendicular to the MD direction, and usually parallel to the width direction and the lateral direction of the long-length film.

Further, in the following description, a diagonal direction of the long-length film refers to an in-plane direction thereof, which is neither parallel nor perpendicular with respect to the width direction of the film, unless otherwise specified.

Further, in the following description, the term "polarization plate" includes not only a rigid member, but also a flexible member such as a resin film, unless otherwise specified.

1. Embodiments

Figure 1:
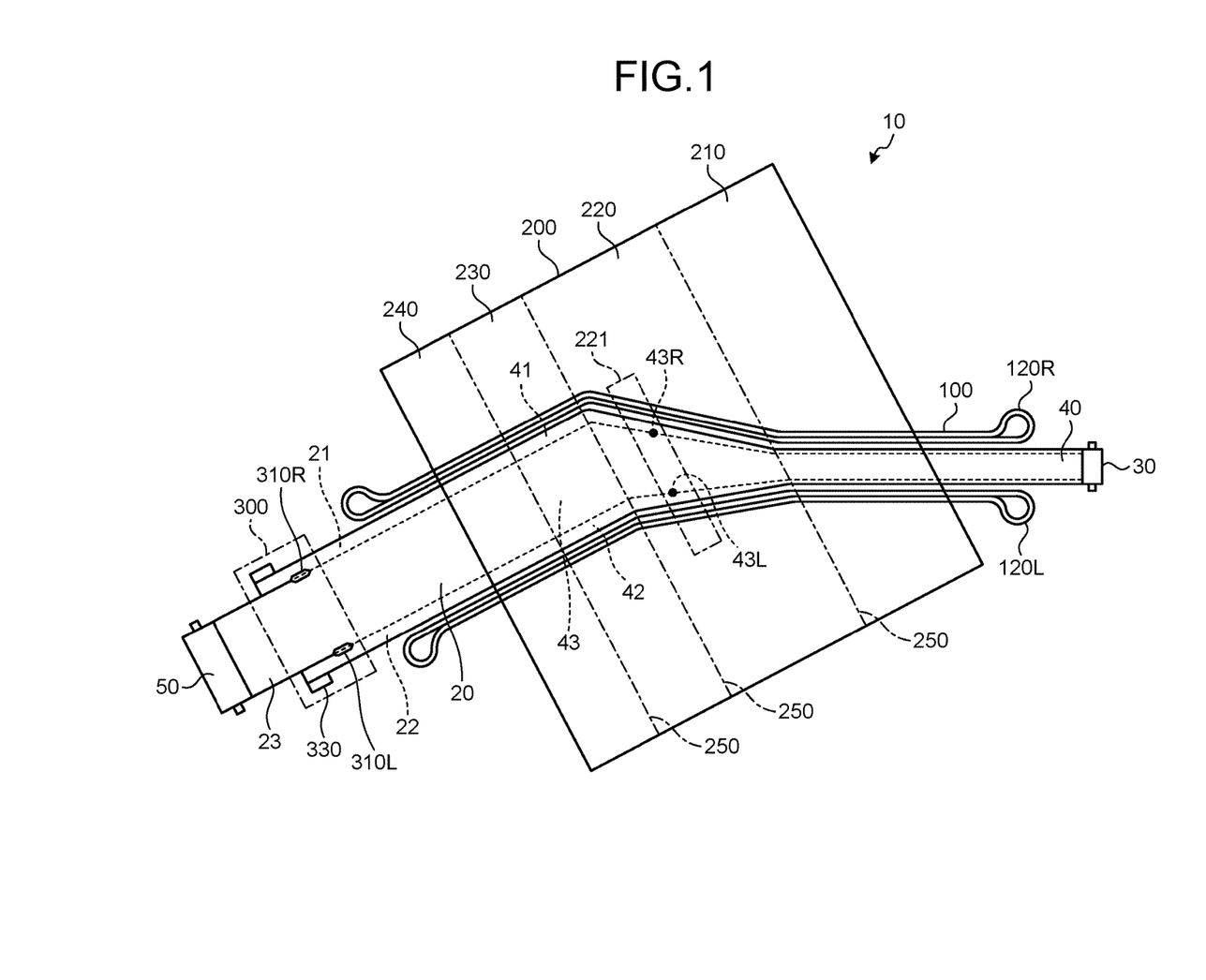
FIG. 1 is a plan view schematically illustrating an apparatus for manufacturing a stretched film according to one embodiment of the present invention.
Figure 2:
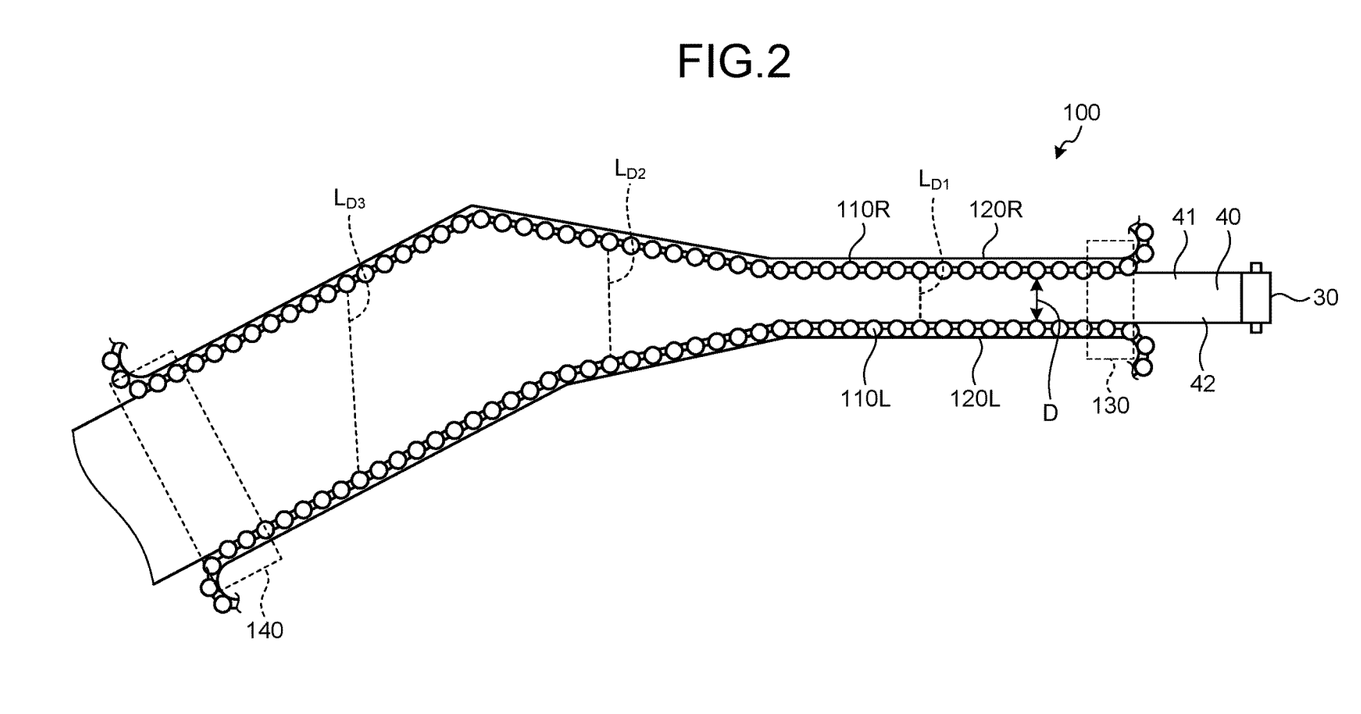
FIG. 2 is a plan view schematically illustrating a tenter device according to one embodiment of the present invention.

FIG. 1 is a plan view schematically illustrating an for manufacturing a stretched film 23 according to one embodiment of the present invention. In FIG. 1, outer grippers 110R and inner grippers 110L of a tenter device 100 are not shown. Further, FIG. 2 is a plan view schematically illustrating the tenter device 100 according to one embodiment of the present invention.

As shown in FIG. 1, the apparatus 10 for manufacturing the stretched film 23 according to one embodiment of the present invention includes the tenter device 100, an oven 200, and a trimming device 300. The manufacturing apparatus 10 is provided such that a resin film 40 is fed out from a feeding roll 30 and the fed resin film 40 is stretched by the tenter device 100, to enable production of a pre-trim film 20. Further, the manufacturing apparatus 10 is provided such that the obtained pre-trim film 20 is cut to remove both end portions 21 and 22 in the width direction as unnecessary portions by the trimming device 300 and a remaining intermediate area is wound into a roll as the stretched film 23 to obtain a film roll 50. In the present embodiment, the intermediate area of the pre-trim film 20 is the same as the stretched film 23 to be recovered as the film roll 50, and thus the intermediate area of the pre-trim film 20 is given the same reference sign "23" as the stretched film 23 in the description.

1.1. Resin Film 40

A thermoplastic resin is usually used as a resin forming the resin film 40. Examples of such a thermoplastic resin may include polyolefin resins such as a polyethylene resin and a polypropylene resin; polymer resins having an alicyclic structure such as norbornene-based resins; cellulose-based resins such as a cellulose diacetate resin and a cellulose triacetate resin; a polyimide resin, a polyamide imide resin, a polyamide resin, a polyether imide resin, a polyetheretherketone resin, a polyether ketone resin, a poly ketone sulfide resin, a polyether sulfone resin, a polysulfone resin, a polyphenylene sulfide resin, a polyphenylene oxide resin, a polyethylene terephthalate resin, a polybutylene terephthalate resin, a polyethylene naphthalate resin, a polyacetal resin, a polycarbonate resin, a polyarylate resin, a (meth)acrylic resin, a polyvinyl alcohol resin, a polypropylene resin, cellulose-based resins, an epoxy resin, a phenol resin, a (meth)acrylic ester-vinyl aromatic compound copolymer resin, an isobutene/N-methylmaleimide copolymer resin, and a styrene/acrylonitrile copolymer resin. One type thereof may be used alone, or two or more types thereof may be used in combination at any ratio.

Of these, the polymer resins having an alicyclic structure are preferable. The polymer resins having an alicyclic structure refer to a resin containing a polymer having an alicyclic structure. Further, the polymer having an alicyclic structure refers to a polymer of which structural unit has an alicyclic structure. The polymer having an alicyclic structure may have an alicyclic structure in a main chain or in a side chain. As the polymer having an alicyclic structure, one type thereof may be used alone, or two or more types thereof may be used in combination at any ratio. Of these, the polymer having an alicyclic structure in a main chain is preferable from the viewpoint of mechanical strength, heat resistance, and the like.

Examples of the alicyclic structure may include a saturated alicyclic hydrocarbon (cycloalkane) structure and an unsaturated alicyclic hydrocarbon (cycloalkene and cycloalkyne) structure. Of these, the cycloalkane structure and the cycloalkene structure are preferable from the viewpoint of, for example, mechanical strength, heat resistance, and the like. Of these, the cycloalkane structure is particularly preferable.

The number of carbon atoms constituting the alicyclic structure is preferably 4 or more and more preferably 5 or more, and is preferably 30 or less, more preferably 20 or less, and particularly preferably 15 or less, per alicyclic structure. When the number of carbon atoms constituting the alicyclic structure is within the above-mentioned range, a resin containing the polymer having such an alicyclic structure exhibits mechanical strength, heat resistance, and formability in a highly balanced manner and thus is preferable.

The ratio of structural units having the alicyclic structure in the polymer having the alicyclic structure may be suitably selected in accordance with the purposes of use, but it is preferably 55% by weight or more, further preferably 70% by weight or more, and particularly preferably 90% by weight or more, and is usually 100% by weight or less. When the ratio of structural units having the alicyclic structure in the polymer having the alicyclic structure is within this range, transparency and heat resistance are improved in a resin containing the polymer having such an alicyclic structure.

Of the polymers having the alicyclic structure, a cycloolefin polymer is preferable. The cycloolefin polymer is a polymer having a structure obtained by polymerization of a cycloolefin monomer. Further, the cycloolefin monomer is a compound which has a ring structure formed of carbon atoms and also has a polymerizable carbon-carbon double bond in the ring structure. Examples of the polymerizable carbon-carbon double bond may include the one capable of performing a polymerization such as a ring opening polymerization. Further, examples of a ring structure of the cycloolefin monomer may include monocyclic, polycyclic, condensed polycyclic and bridged polycyclic structures, and polycyclic structures in which these structures are combined. Of these, the cycloolefin monomer having the polycyclic structure is preferable from the viewpoint of obtaining a polymer that exhibits properties such as dielectric property and heat resistance in a highly balanced manner.

Examples of preferable cycloolefin polymers among those described above may include a norbornene-based polymer, a cyclic olefin polymer having a monocyclic structure, a cyclic conjugated diene polymer, and hydrogenated products thereof. Of these, the norbornene-based polymer is particularly preferable because of its excellent formability.

Examples of the norbornene-based polymer may include a ring-opened polymer of a norbornene structure-containing monomer, or a ring-opened copolymer of a norbornene structure-containing monomer and an optional monomer, or hydrogenated products thereof; and an addition polymer of a norbornene structure-containing monomer, or an addition copolymer of a norbornene structure-containing monomer and an optional monomer, or hydrogenated products thereof. Of these, the hydrogenated product of the ring-opened (co)polymer of a norbornene structure-containing monomer is particularly preferable from the viewpoint of formability, heat resistance, low hygroscopicity, size stability, light-weight property, and the like. In this description, the term "(co)polymer" refers to polymer and copolymer.

Examples of the monomer containing a norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$] deca-3-ene (common name: methanotetrahydrofluorene), tetracyclo[4.4.0.1$^{2,5}$.1$^{7,10}$]dodeca-3-ene (common name:

tetracyclododecene), and derivatives of these compounds (e.g., the ones having a substituent on the ring structure). Examples of the substituent may include an alkyl group, an alkylene group, and a polar group. Further, a plurality of such substituents may be bonded to the ring structure wherein the substituents are the same or mutually different. Further, as the norbornene structure-containing monomer, one type thereof may be used alone, or two or more types thereof may be used in combination at any ratio.

Examples of types of the polar group may include a hetero atom or an atomic group containing a hetero atom. Examples of the hetero atom may include an oxygen atom, a nitrogen atom, a sulfur atom, a silicon atom, and a halogen atom. Specific examples of the polar group may include a carboxyl group, a carbonyl-oxy-carbonyl group, an epoxy group, a hydroxyl group, an oxy group, an ester group, a silanol group, a silyl group, an amino group, a nitrile group, and a sulfonic acid group.

Examples of the optional monomer that is capable of undergoing a ring-opening copolymerization with the norbornene structure-containing monomer may include monocyclic olefins such as cyclohexene, cycloheptene, and cyclooctene, and derivatives thereof; and cyclic conjugated dienes such as cyclohexadiene and cycloheptadiene, and derivatives thereof. As the optional monomer that is capable of undergoing a ring-opening copolymerization with the norbornene structure-containing monomer, one type thereof may be used alone, or two or more types thereof may be used in combination at any ratio.

The ring-opened polymer of the norbornene structure-containing monomer and the ring-opened copolymer of the norbornene structure-containing monomer and the optional monomer that is capable of undergoing a copolymerization therewith may be produced, for example, by polymerizing or copolymerizing such monomers in the presence of a publicly known ring-opening polymerization catalyst.

Examples of the optional monomer that is capable of undergoing an addition copolymerization with the norbornene structure-containing monomer may include α-olefins having 2 to 20 carbon atoms such as ethylene, propylene, and 1-butene, and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Of these, the α-olefins are preferable, and ethylene is more preferable. Further, as the optional monomer that is capable of undergoing an addition copolymerization with the norbornene structure-containing monomer, one type thereof may be used alone, or two or more types thereof may be used in combination at any ratio.

The addition polymer of the norbornene structure-containing monomer and the addition copolymer of the norbornene structure-containing monomer and the optional monomer that is capable of undergoing an addition copolymerization therewith may be produced, for example, by polymerizing or copolymerizing such monomers in the presence of a publicly known addition polymerization catalyst.

The hydrogenated product of the ring-opened polymer of the norbornene structure-containing monomer, the hydrogenated product of the ring-opened copolymer of the norbornene structure-containing monomer and the optional monomer that is capable of undergoing a ring-opening copolymerization therewith, the hydrogenated product of the addition polymer of the norbornene structure-containing monomer, and the hydrogenated product of the addition copolymer of the norbornene structure-containing monomer and the optional monomer that is capable of undergoing an addition copolymerization therewith may be produced, for example, by hydrogenating a carbon-carbon unsaturated bond preferably by 90% or more in a solution of these polymers in the presence of a publicly known hydrogenation catalyst containing transition metal such as nickel and palladium.

As the norbornene-based polymer, it is preferable that the polymer has an X: bicyclo[3.3.0]octane-2,4-diyl-ethylene structure and a Y: tricyclo[4.3.0.1$^{2,5}$]decane-7,9-diyl-ethylene structure as a structural unit, the content of these structural units is 90% by weight or more with respect to the entire structural unit content of the norbornene-based polymer, and a content ratio between X and Y is 100:0 to 40:60 in weight ratio of X:Y. By using such a polymer, it is possible to obtain a resin layer containing such a norbornene-based polymer as a layer with a reduced size change over a long period of time and with a superior stability of optical properties.

Examples of the cyclic olefin polymer having a monocyclic structure may include an addition polymer of a cyclic olefin monomer having a monocyclic structure, such as cyclohexene, cycloheptene, and cyclooctene.

Examples of the cyclic conjugated diene polymer may include a polymer obtained by performing a cyclization reaction of an addition polymer of a conjugated diene monomer, such as 1,3-butadiene, isoprene, and chloroprene; a 1,2-addition polymer or a 1,4-addition polymer of a cyclic conjugated diene monomer, such as cyclopentadiene and cyclohexadiene; and hydrogenated products thereof.

The weight-average molecular weight (Mw) of the polymer having an alicyclic structure is preferably 10,000 or more, more preferably 15,000 or more, and particularly preferably 20,000 or more, and is preferably 100,000 or less, more preferably 80,000 or less, and particularly preferably 50,000 or less. When the weight-average molecular weight is in such a range, the stretched film exhibits mechanical strength and formability in a highly balanced manner and thus is preferable. The above-mentioned weight-average molecular weight is a value in terms of polyisoprene or polystyrene measured by a gel permeation chromatography using cyclohexane as a solvent. However, if the sample is insoluble in cyclohexane in the above-mentioned gel permeation chromatography, toluene may be used as the solvent.

The molecular weight distribution (weight-average molecular weight (Mw)/number-average molecular weight (Mn)) of the polymer having an alicyclic structure is preferably 1.2 or more, more preferably 1.5 or more, and particularly preferably 1.8 or more, and is preferably 3.5 or less, more preferably 3.0 or less, and particularly preferably 2.7 or less. By setting the molecular weight distribution to the lower limit value or higher in the above-mentioned range, it becomes possible to increase the productivity of the polymer and reduce the manufacturing cost. By setting it to the upper limit value or lower, the content of low molecular components is reduced, and thus it becomes possible to improve the stability of the stretched film by suppressing relaxation of the film in exposure to a high temperature.

Further, the resin forming the stretched film may contain an optional component in addition to the polymer. Examples of the optional component may include additives such as a coloring agent such as a pigment and dye; a plasticizer; a fluorescent brightening agent; a dispersant; a heat stabilizer; a light stabilizer; an ultraviolet absorbing agent; an antistatic agent; an antioxidant; a microparticle; and a surfactant. One type of these components may be used alone, or two or more types thereof may be used in combination at any ratio. However, the amount of the polymer contained in the resin is preferably 50% by weight to 100% by weight or 70% by weight to 100% by weight.

The glass transition temperature Tg of the resin forming the resin film 40 is preferably 100° C. or higher, more preferably 110° C. or higher, and particularly preferably 120° C. or higher, and is preferably 200° C. or lower, more preferably 190° C. or lower, and particularly preferably 180° C. or lower. By setting the glass transition temperature of the resin forming the stretched film to the lower limit value or higher in the above-mentioned range, it becomes possible to enhance the durability of the stretched film in a high temperature environment. By setting it to the upper limit value or lower, the stretching process can be easily performed.

The absolute value of a photoelastic coefficient of the resin forming the resin film 40 is preferably $10 \times 10^{-12}$ Pa$^{-1}$ or less, more preferably $7 \times 10^{-12}$ Pa$^{-1}$ or less, and particularly preferably $4 \times 10^{-12}$ Pa$^{-1}$ or less. By setting the value in this manner, variations of the in-plane retardation in the stretched film can be reduced. The photoelastic coefficient C is a value expressed by $C=\Delta n/\sigma$, where $\Delta n$ is the birefringence and $\sigma$ is the stress.

The present embodiment will be described by way of an example in which a pre-stretch film that is not subjected to the stretching process is used as the resin film 40. Such a pre-stretch film may be obtained, for example, by cast molding, extrusion molding, inflation molding and the like. Of these, the extrusion molding produces the film containing a reduced amount of residual volatile components and exhibiting excellent size stability, and is thus preferable.

1.2. Tenter Device 100

As shown in FIG. 1, the tenter device 100 is a device capable of stretching the resin film 40 fed out from the feeding roll 30. This tenter device 100 includes, as shown in FIG. 2, outer grippers 110R as first grippers, inner grippers 110L as second grippers, and a pair of guide rails 120R and 120L. The outer grippers 110R and the inner grippers 110L are provided so as to be capable of holding end portions 41 and 42 of the resin film 40, respectively. Further, the guide rails 120R and 120L are provided at both sides of a film conveying path in order to guide the above-mentioned outer grippers 110R and inner grippers 110L.

The outer grippers 110R are provided so as to be capable of travelling along the guide rail 120R provided on the right side of the film conveying path. Further, the inner grippers 110L are provided so as to be capable of travelling along the guide rail 120L provided on the left side of the film conveying path. The terms "right" and "left" in the present embodiment refer to directions when the conveyance direction is observed from the upstream to the downstream sides, unless otherwise specified.

A large number of the outer grippers 110R and a large number of the inner grippers 110L are provided. Further, the outer grippers 110R and the inner grippers 110L are provided so as to be capable of travelling at a constant speed while maintaining a constant distance from the ones before and after each of the outer grippers 110R and the inner grippers 110L.

Further, the outer grippers 110R and the inner grippers 110L are configured to be capable of holding the both end portions 41 and 42 in the width direction of the resin film 40 sequentially supplied to the tenter device 100 at an inlet portion 130 of the tenter device 100 and releasing them at an outlet portion 140 of the tenter device 100.

The guide rails 120R and 120L have a continuous endless track so that the outer grippers 110R and the inner grippers 110L can go around a specific track. For this purpose, the tenter device 100 is configured to be capable of sequentially returning the outer grippers 110R and the inner grippers 110L that release the resin film 40 at the outlet portion 140 to the inlet portion 130.

The guide rails 120R and 120L have an asymmetric shape that corresponds to conditions such as a direction of the slow axis and a stretch ratio of the stretched film 23 to be produced. In the present embodiment, the shapes of the guide rails 120R and 120L are formed to be capable of conveying the resin film 40 such that the outer grippers 110R and the inner grippers 110L guided by these guide rails 120R and 120L can bend a traveling direction of the resin film 40 toward the left side when the conveyance direction is seen from the upstream to the downstream sides. The traveling direction of the resin film 40 refers to a moving direction at a middle point in the width direction of the resin film 40.

In this manner, since the shapes of the guide rails 120R and 120L are formed so as to bend the traveling direction of the resin film 40 toward the left side, a distance of the track on which the outer grippers 110R travel while holding the resin film 40 becomes longer than a distance of the track on which the inner grippers 110L travel while holding the resin film 40. Consequently, the outer grippers 110R and the inner grippers 110L are arranged so as to face each other in a direction perpendicular to the traveling direction of the resin film 40 at the inlet portion 130 of the tenter device 100, however the inner grippers 110L can precede the outer grippers 110R at the outlet portion 140 of the tenter device 100. Thus, the tenter device 100 having such a configuration can stretch the resin film 40 in a diagonal direction thereof (see broken lines $L_{D1}$ to $L_{D3}$ in FIG. 2).

1.3. Oven 200

As shown in FIG. 1, the manufacturing apparatus 10 is provided with an oven 200 so as to cover the tenter device 100. Thus, the tenter device 100 is configured to be capable of conveying the resin film 40 so as to allow the resin film 40 to pass through the oven 200 in a state that the both ends portions 41 and 42 of the resin film 40 are held by the outer grippers 110R and the inner grippers 110L.

The oven 200 has a preliminary heating zone 210, a stretching zone 220, a thermal fixing zone 230, and a reheating zone 240 in this order from the upstream side in the conveyance direction. Since the preliminary heating zone 210, the stretching zone 220, the thermal fixing zone 230, and the reheating zone 240 are each partitioned by partition walls 250, the oven 200 has a configuration that can independently adjust temperatures of the preliminary heating zone 210, the stretching zone 220, the thermal fixing zone 230, and the reheating zone 240.

The preliminary heating zone 210 is a section provided at an immediate downstream side of an entrance of the oven 200. The preliminary heating zone 210 is usually provided so as to allow the outer grippers 110R and the inner grippers 110L holding the both end portions 41 and 42 of the resin film 40 to travel while keeping a constant distance D (see FIG. 2) between each other.

The temperature of the preliminary heating zone 210 is set so that the temperature of the resin film 40 becomes higher than a normal temperature. Specific temperature of the resin film 40 in the preliminary heating zone 210 is preferably 40°

C. or higher, more preferably Tg+5° C. or higher, and particularly preferably Tg+15° C. or higher, and is preferably Tg+50° C. or lower, more preferably Tg+30° C. or lower, and particularly preferably Tg+20° C. or lower. Here, Tg represents a glass transition temperature of the resin forming the resin film 40. By performing preliminary heating at such a temperature, molecules contained in the resin film 40 can be stably oriented by stretching.

When the temperature of the resin film 40 is measured while being conveyed, the resin film 40 can be damaged if a temperature sensor comes into contact with the resin film 40. Thus, in the present embodiment, a temperature in a space within a distance of 5 mm from a measurement target area of the resin film 40 may measured and this temperature may be adopted as the temperature of the measurement target area of the resin film 40.

The stretching zone 220 is, as shown in FIG. 1, a section from a point where a distance between the outer grippers 110R and the inner grippers 110L holding the both end portions 41 and 42 of the resin film 40 is started to open up, to another point where the distance therebetween becomes constant again. As described before, in the present embodiment, the shapes of the guide rails 120R and 120L are formed so as to bend the traveling direction of the resin film 40 toward the left side. Thus, in the stretching zone 220, the traveling distance of the outer grippers 110R is set longer than that of the inner grippers 110L.

Further, in the present embodiment, the stretching zone 220 includes a specific zone 221 having a specific temperature gradient in the width direction of the resin film 40. The temperature gradient of the specific zone 221 in the width direction of the resin film 40 is set such that an end portion temperature $T_L$ on the inner gripper 110L side of an intermediate area 43 of the resin film 40 can be made higher than an end portion temperature $T_R$ on the outer gripper 110R side by a specific temperature. Specifically, the specific temperature into which the difference $T_L-T_R$ between the end portion temperature $T_L$ and the end portion temperature $T_R$, mentioned above, should be confined is usually 5° C. or higher and preferably 9° C. or higher, and is usually 15° C. or lower, preferably 13° C. or lower, and more preferably 11° C. or lower. By including the specific zone 221 having such a temperature gradient in the stretching zone 220, the temperature gradient is generated in the width direction of the resin film 40 passing through the specific zone 221 such that the end portion temperature $T_L$ on the inner gripper 110L side of the intermediate area 43 becomes higher than the end portion temperature $T_R$ on the outer gripper 110R side by the specific temperature. In this manner, it becomes possible to suppress generation of slack that occurs at a left-side edge and its vicinity of the pre-trim film 20 and the stretched film 23.

The intermediate area 43 of the resin film 40 is the area the resin film 40 other than the both end portions 41 and 42 in the width direction of the resin film 40. In FIG. 1, boundaries between the intermediate area 43 and the both end portions 41 and 42 of the resin film 40, as well as boundaries between the intermediate area 23 and the both end portions 21 and 22 of the pre-trim film 20 produced from the resin film 40, are shown by broken lines. Further, the end portion temperature $T_R$ on the outer gripper 110R side of the intermediate area 43 refers to a temperature of an end portion 43R of the intermediate area 43 closer to the outer grippers 110R. Further, the end portion temperature $T_L$ on the inner gripper 110L side of the intermediate area 43 refers to a temperature of an end portion 43L of the intermediate area 43 closer to the inner grippers 110L.

The both end portions 41 and 42 of the resin film 40 are held by the grippers 110R and the grippers 110L and thus are possibly damaged. Furthermore, the stress generated by stretching is hardly transmitted to the both end portions 41 and 42 of the resin film 40 by being held by the grippers 110R and the grippers 110L, and thus these end portions may not be stretched as desired. For this reason, the both end portions 21 and 22 of the pre-trim film 20 corresponding to the both end portions 41 and 42 of the resin film 40 are usually cut and removed from the pre-trim film 20 and not included in a final product. Accordingly, the intermediate area 23 of the pre-trim film 20 excluding the both end portions 21 and 22 becomes the stretched film 23 as a final product. Therefore, it is desirable also in the resin film 40 to control the quality of the intermediate area 43 excluding the both end portions 41 and 42. Due to such circumstances, the oven 200 according to the present embodiment is, as described before, configured to be capable of controlling the temperature gradient of the intermediate area 43 of the resin film 40 as an area corresponding to the stretched film 23 that can be a final product.

Further, the temperature of the specific zone 221 is preferably set such that the end portion temperature $T_R$ on the outer gripper 110R side and the end portion temperature $T_L$ on the inner gripper 110L side of the intermediate area 43 of the resin film 40 can both be confined within a specific temperature range. Specifically, the above-mentioned temperature range is preferably Tg+13° C. or higher, more preferably Tg+15° C. or higher, and particularly preferably Tg+18° C. or higher, and is preferably Tg+30° C. or lower, more preferably Tg+25° C. or lower, and particularly preferably Tg+20° C. or lower. By setting the temperature of the specific zone 221 in this manner, slack of the pre-trim film 20 and the stretched film 23 can be more reliably suppressed. Further, molecules contained in the resin film 40 can be reliably oriented by stretching.

As a configuration of the specific zone 221 having the temperature gradient as described above, various configurations can be adopted. For example, the stretching zone 220 may be partitioned by partition walls that are not shown, to divide the stretching zone into a plurality of zones each of which temperatures can be independently controlled. In this case, a temperature control device may be provided to each of these zones. The temperature control device may also be the one including nozzles of which opening can be adjusted and capable of sending hot air into the stretching zone 220, the nozzles being provided side by side in the width direction of the resin film 40. With such a temperature control device, the temperature gradient in the width direction can be realized by adjusting the opening of the nozzles in the width direction. As another example of the temperature control device, the one including infrared heaters of which output can be adjusted and which are provided side by side in the width direction of the resin film 40 may be used. With such a temperature control device, the temperature gradient in the width direction can be realized by adjusting the output of the heaters in the width direction.

The average temperature of the stretching zone 220 including the specific zone 221 is usually set such that the temperature of the resin film 40 becomes higher than a normal temperature. Specific temperature of the resin film 40 in the stretching zone 220 is preferably Tg+3° C. or higher, more preferably Tg+5° C. or higher, and particularly preferably Tg+8° C. or higher, and is preferably Tg+15° C. or lower, more preferably Tg+12° C. or lower, and particularly preferably Tg+10° C. or lower. By performing stretching at such a temperature, molecules contained in the resin film 40 can be stably oriented by stretching and a desired phase difference can be obtained.

The thermal fixing zone 230 is a section located downstream of the stretching zone 220, in which the outer grippers 110R and the inner grippers 110L can travel while keeping the distance D between each other constant again.

The temperature of the thermal fixing zone 230 is set such that the temperature of the resin film 40 becomes lower than the temperature of the resin film 40 in the stretching zone 220. Specific temperature of the resin film 40 in the thermal fixing zone 230 is preferably Tg−5° C. or higher, more preferably Tg−2° C. or higher, particularly preferably Tg° C. or higher, and preferably Tg+10° C. or lower, more preferably Tg+5° C. or lower, particularly preferably Tg+2° C. or lower. By performing thermal fixing at such a temperature, a degree and a direction of the orientation of molecules contained in the stretched film 23 can be more precisely controlled.

The reheating zone 240 is a section located downstream of the thermal fixing zone 230, in which the outer grippers 110R and the inner grippers 110L can travel while keeping the distance D between each other constant.

The temperature of the reheating zone 240 is set such that the resin film 40 can be heated to reach a specific temperature higher than the temperature of the resin film 40 in the thermal fixing zone 230. Specific temperature of the resin film 40 in the reheating zone 240 is usually Tg+5° C. or higher, preferably Tg+7° C. or higher, and more preferably Tg+10° C. or higher, and is usually Tg+20° C. or lower, preferably Tg+17° C. or lower, and more preferably Tg+15° C. or lower. By performing reheating of the resin film 40 in the reheating zone 240 in this manner, slack that occurs at a left-side edge and its vicinity of the pre-trim film 20 and the stretched film 23 to be produced can be suppressed.

Further, when the temperature of the resin film 40 in the thermal fixing zone 230 is defined as T1 and the temperature of the resin film 40 in the reheating zone 240 is defined as T2, T2 is higher than T1. It is preferable that T1 and T2 satisfy the relationship expressed by 3° C.≤T2−T1≤10° C.

The residence time of the resin film 40 in the reheating zone 240 is preferably 2 seconds or longer and more preferably 4 seconds or longer, and is preferably 10 seconds or shorter and more preferably 8 seconds or shorter.

By setting the residence time of the resin film 40 in the reheating zone 240 to the lower limit or higher in the above-mentioned range, slack that may occur at a left-side edge and its vicinity of the pre-trim film 20 and the stretched film 23 can be effectively suppressed. Further, by setting it to the upper limit or lower, relaxation of the orientation in the resin film 40 can be prevented.

1.4. Trimming Device 300

The manufacturing apparatus 10 includes the trimming device 300 at the downstream of the tenter device 100. The trimming device 300 is a device for cutting and removing the unnecessary both end portions 21 and 22 from the pre-trim film 20 conveyed from the tenter device 100.

Figure 3:
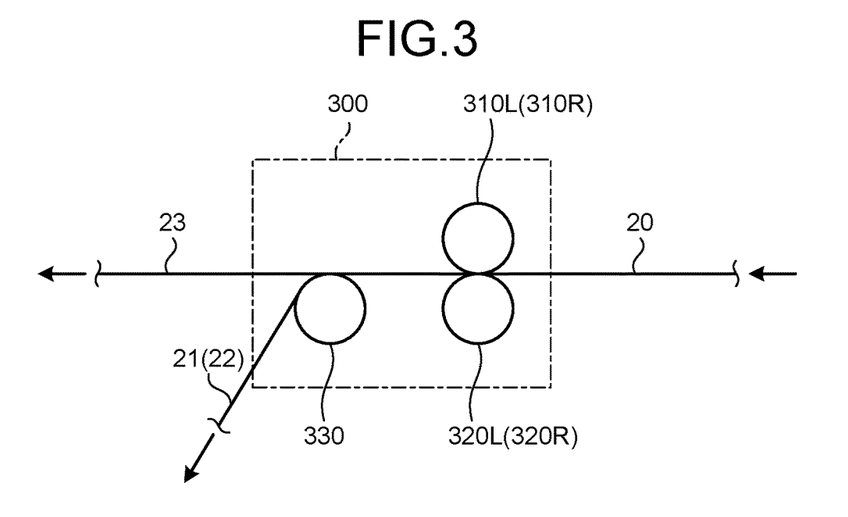
FIG. 3 is a side view schematically illustrating a trimming device according to one embodiment of the present invention.

FIG. 3 is a side view schematically illustrating the trimming device 300 according to one embodiment of the present invention.

The trimming device 300 includes, as shown in FIG. 3, trimming knives 310R and 310L provided on one side of the pre-trim film 20 and trimming knives 320R and 320L provided on the other side. The trimming knives 310R, 310L, 320R, and 320L all have a structure in which a blade is attached to an outer periphery of a disk. The trimming knives 310R and 320R are provided on the border between the intermediate area 23 and the end portion 21 of the pre-trim film 20, and the trimming knives 310L and 320L are provided on the border between the intermediate area 23 and the end portion 22 of the pre-trim film 20.

The trimming knives 310R and 320R are adjacently provided such that the blade of the trimming knife 310R and the blade of the trimming knife 320R overlap each other. Further, locations of the trimming knives 310R and 320R are adjusted such that a cross point where the blade of the trimming knife 310R and the blade of the trimming knife 320R, mentioned above, overlap each other is positioned to the conveying path of the pre-trim film 20 conveyed in the trimming device 300. Further, the trimming knives 310L and 320L are adjacently provided such that the blade of the trimming knife 310L and the blade of the trimming knife 320L overlap each other. Further, locations of the trimming knives 310L and 320L are adjusted such that a cross point where the above-mentioned overlapping of the blade of the trimming knife 310L and the blade of the trimming knife 320L is positioned to the conveying path of the pre-trim film 20 conveyed in the trimming device 300. Further, the trimming knives 310R, 310L, 320R, and 320L are provided so as to rotate by a driving device that is not shown. Accordingly, the trimming device 300 is configured such that the pre-trim film 20 conveyed in the trimming device 300 can be cut and separated into the intermediate area 23, and the both end portions 21 and 22 by the rotating trimming knives 310R, 310L, 320R, and 320L.

Further, the trimming device 300 includes a conveyance roll 330 at the downstream of the trimming knives 310R, 310L, 320R, and 320L. By including the conveyance roll 330, the trimming device 300 is configured to be capable of guiding the both end portions 21 and 22 cut out from the pre-trim film 20 by the trimming knives 310R, 310L, 320R, and 320L to a different place from the intermediate area 23 of the pre-trim film 20.

1.5. Method for Manufacturing Stretched Film

The manufacturing apparatus 10 of the stretched film 23 according to one embodiment of the present invention is configured as described above. When the manufacturing apparatus 10 is used for producing the stretched film 23, the method for manufacturing the stretched film 23 described below is performed.

As shown in FIG. 1, in the method for manufacturing the stretched film 23 according to the present embodiment, a step of feeding out the long-length resin film 40 from the feeding roll 30 and continuously supplying the fed-out resin film 40 to the tenter device 100 is performed. Subsequently, the tenter device 100 conveys the resin film 40 so as to allow the resin film 40 to pass through the oven 200 in a state in which the both ends portions 41 and 42 of the resin film 40 are held by the outer grippers 110R and the inner grippers 110L.

Specifically, at the inlet portion 130 (see FIG. 2) of the tenter device 100, a step of sequentially holding with the outer grippers 110R and the inner grippers 110L the both ends portions 41 and 42 of the resin film 40 is performed. The resin film 40 of which the both ends portions 41 and 42 are held is conveyed along with the traveling of the outer grippers 110R and the inner grippers 110L and enters the oven 200.

After the resin film 40 enters the oven 200, a step of passing the resin film 40 through the preliminary heating zone 210 of the oven 200 along with the traveling of the outer grippers 110R and the inner grippers 110L is performed. The resin film 40 passing through the preliminary heating zone 210 is heated and reaches a desired temperature.

After the resin film 40 passes through the preliminary heating zone 210, a step of passing the resin film 40 through the stretching zone 220 of the oven 200 is performed. The outer grippers 110R and the inner grippers 110L, facing each other in a direction perpendicular to the traveling direction of the resin film 40 at the inlet portion 130 of the tenter device 100, travel along the guide rails 120R and 120L having asymmetrical shapes to each other in the stretching zone 220. Accordingly, the outer grippers 110R and the inner grippers 110L travel in the stretching zone 220 such that a travel distance of the outer grippers 110R becomes longer than a travel distance of the inner grippers 110L. Consequently, the inner grippers 110L precede the outer grippers 110R in the sections downstream of the stretching zone 220 (see broken lines $L_{D1}$, $L_{D2}$, and $L_{D3}$ in FIG. 2). By stretching the resin film 40 by the outer grippers 110R and the inner grippers 110L traveling in this manner, a step of stretching the resin film 40 in a diagonal direction with respect to the width direction of the stretched film 23 to be obtained is performed in the stretching zone 220.

The stretch ratio in this process is preferably 1.1 times or more, preferably 1.2 times or more, and particularly preferably 1.3 times or more, and is preferably 3.0 times or less, more preferably 2.5 times or less, and particularly preferably 2.0 times or less. By setting the stretch ratio to the lower limit value or higher in the above-mentioned range, a degree and a direction of the orientation of molecules contained in the stretched film 23 can be more precisely controlled. Further, by setting it to the upper limit value or lower, breakage of the film can be suppressed and the long-length film having a slow axis in a diagonal direction can be stably obtained.

Further, in the present embodiment, temperature adjustment is performed in the specific zone 221 of the stretching zone 220 so as to generate the above-mentioned temperature gradient in the width direction of the resin film 40. Accordingly, the resin film 40 passing through the specific zone 221 is stretched in a state of having the above-mentioned temperature gradient in the width direction.

After the resin film 40 passes through the stretching zone 220, a step of passing the resin film 40 through the thermal fixing zone 230 in the oven 200 is performed. In the thermal fixing zone 230, the temperature of the resin film 40 is adjusted within the above-mentioned temperature range lower than the temperature of the resin film 40 in the stretching zone 220. At such a temperature, a molecular state in the resin film 40 is stabilized and the orientation of molecules in the resin film 40 is fixed.

After the resin film 40 passes through the thermal fixing zone 230, a step of passing the resin film 40 through the reheating zone 240 in the oven 200 is performed. At the reheating zone 240, the temperature of the resin film 40 is adjusted within the above-mentioned temperature range higher than the temperature of the resin film 40 in the thermal fixing zone 230. By reheating the resin film 40 in the reheating zone 240 and performing the temperature adjustment for generating the temperature gradient in the specific zone 221 in combination, occurrence of slack at a left-side edge of the pre-trim film 20 and the stretched film 23 to be produced can be suppressed.

After passing through the reheating zone 240, the resin film 40 comes outside the oven 200. Then, when the resin film 40 is conveyed up to the outlet portion 140 of the tenter device 100, it is released from the outer grippers 110R and the inner grippers 110L and sent out to the trimming device 300. The stretching process is performed in the tenter device 100 as described above, and thus the resin film 40 subjected to the stretching process is converted to the pre-trim film 20 that has been stretched in a diagonal direction with respect to the width direction thereof.

The pre-trim film 20 usually has a slow axis in a diagonal direction with respect to the width direction as a result of being subjected to the stretching process as described above. However, there is a possibility that the both end portions 21 and 22 in the width direction of the pre-trim film 20 do not have desired optical properties. Thus, the both end portions 21 and 22 in the width direction of the pre-trim film 20 are cut and removed by the trimming device 300, thereby allowing to recover the intermediate area 23 without having the both end portions 21 and 22.

Specifically, when the pre-trim film 20 sent out from the tenter device 100 is conveyed up to the trimming device 300, as shown in FIG. 3, the pre-trim film 20 is cut at the boundaries between the both end portions 21 and 22, and the intermediate area 23 by the trimming knives 310R, 310L, 320R, and 320L of the trimming device 300. Then, the both end portions 21 and 22 of the pre-trim film 20 are guided to a different place from the intermediate area 23 by the conveyance roll 330 and recovered. On the other hand, the intermediate area 23 of the pre-trim film 20 is sent out to the downstream of the trimming device 300 and, as shown in FIG. 1, wound into a roll as the stretched film 23, which is then recovered as the film roll 50.

As described above, according to the method for manufacturing the present embodiment, the stretched film 23 having a slow axis in a diagonal direction with respect to the width direction thereof can be produced. This stretched film is a film formed of the same resin as the resin film 40, i.e. the film before stretching, and is stretched in one diagonal direction with respect to the width direction thereof. Further, in the present embodiment, since the resin film 40 in use is a pre-stretch film, the stretched film 23 is produced as a uniaxially stretched film.

In the stretched film 23 produced by the above-mentioned manufacturing method, slack at a left-side edge portion in the width direction thereof is suppressed.

In a prior-art method in which the stretched film is produced by stretching the resin film in a diagonal direction with respect to the width direction, slack sometimes occurs at an edge portion on one side of the stretched film that is produced. Specifically, when the resin film was stretched by being conveyed such that the traveling direction of the film is bent toward a right or left side, the residual stress in the resin film became uneven in the width direction and slack occurred at an edge portion on the inner side of the bending direction.

In contrast, in the method for manufacturing the present embodiment described above, slack that occurs in the prior-art method can be suppressed. Thus, handleability and transportability of the stretched film 23 can be improved. Furthermore, flatness of the stretched film 23 can be usually improved.

1.6. Modified Examples

The present invention is not limited to the above-mentioned embodiments and may be further changed for implementation.

For example, as the resin film 40, a stretched film obtained by stretching a pre-stretch film in any direction may be used.

As a method of stretching the resin film 40 in prior to being supplied to the manufacturing apparatus 10 according to the present embodiment, for example, a longitudinal stretching method of such as a roll-type and a float-type, a lateral stretching method using a tenter, and the like may be used. Of these, the float-type longitudinal stretching method is preferable for the purpose of maintaining the uniformity of thickness and optical properties.

2. Description of Stretched Film

Hereinafter, the long-length stretched film produced by the manufacturing method described above will be described.

The stretched film has a slow axis in a specific range on average with respect to the width direction thereof. Specifically, the stretched film has a slow axis in an angle range of 5° or more and 85° or less on average with respect to the width direction thereof. In this description, the film having a slow axis in the specific range on average with respect to the width direction thereof means that, when an angle formed by the width direction of the film and the slow axis is measured at a plurality of points in the width direction of the film, an average value of the angles measured on these points falls within the above-mentioned specific range. The angle formed by the width direction of the film and the slow axis may be, hereinafter, appropriately referred to as an "orientation angle". Further, an average value of the above-mentioned orientation angle θ may be, hereinafter, appropriately referred to as an "average orientation angle". The average orientation angle θ of the stretched film is usually 5° or more and preferably 40° or more, and is usually 85° or less and preferably 50° or less. Since the above-mentioned slow axis is expressed by stretching the resin film in a diagonal direction, a concrete value of the above-mentioned average orientation angle θ may be adjusted by stretching conditions in the manufacturing method described above.

In the stretched film, slack at an edge portion in the width direction can be suppressed. The slack can be evaluated by a length ratio of the both edge portions in the width direction of the stretched film. The above-mentioned length ratio of the stretched film obtained by the manufacturing method described above is preferably 0.9975 or more, more preferably 0.9990 or more, and particularly preferably 0.9995 or more, and is preferably 1.0025 or less, more preferably 1.0010 or less, and particularly preferably 1.0005 or less. Having the above-mentioned length ratio within this range indicates that slack of the stretched film is small.

The length ratio of the both edge portions in the width direction of the stretched film may be measured as follows.

Figure 4:
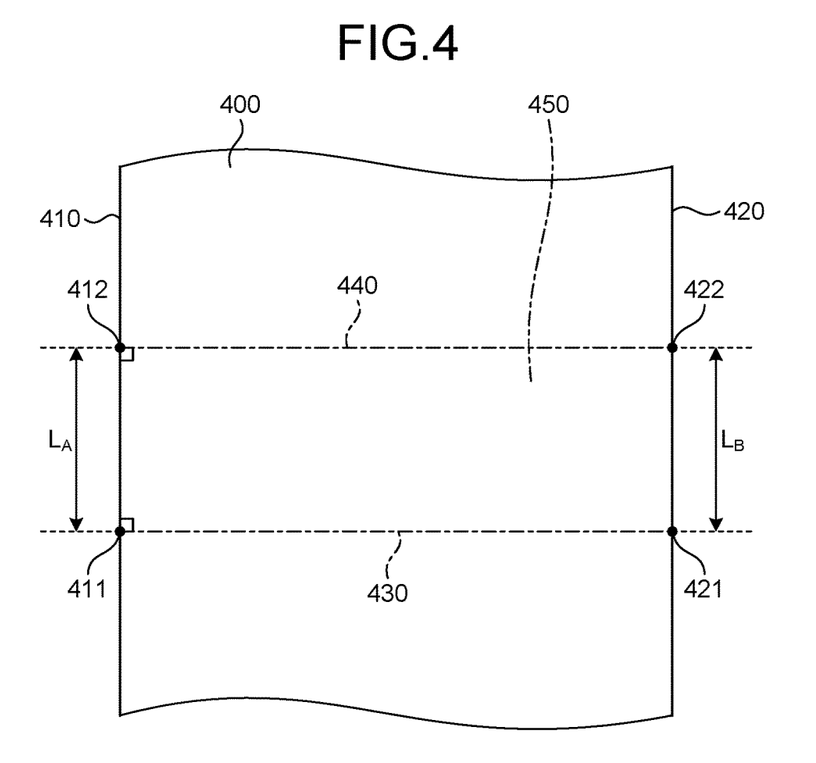
FIG. 4 is a plan view schematically illustrating a stretched film for describing a method for measuring a length ratio of both edge portions in the width direction of the stretched film.

FIG. 4 is a plan view schematically illustrating the stretched film for describing a method for measuring the length ratio of the both edge portions in the width direction of the stretched film.

As shown in FIG. 4, a stretched film 400 is prepared. Both edges 410 and 420 in the width direction of the stretched film 400 form mutually parallel straight lines. A section having a specific length is set on the one edge 410 in the width direction among the edges 410 and 420 of the stretched film 400. Then, the stretched film 400 is linearly cut along a direction within a range of 90.00°±0.03° with respect to the edge 410 from each end point 411 or 412 of this section. With this operation, a rectangular film piece 450 formed of four sides composed of the two mutually opposing edges 410 and 420 of the stretched film 400 and two mutually opposing edges 430 and 440 appearing after cutting is obtained as a sample for measurement. Then, a length $L_A$ of a side of the film piece 450 corresponding to the edge 410 and a length $L_B$ of a side corresponding to the edge 420 are measured. That is, the distance $L_A$ between vertexes 411 and 412, where the edges 430 and 440 appearing after cutting intersect with the reference edge 410, is measured and the distance $L_B$ between vertexes 421 and 422, where the edges 430 and 440 appearing after cutting intersect with the edge 420 opposing to the reference edge 410, is further measured. Then, a ratio $L_A/L_B$ between the distance $L_A$ and the distance $L_B$ is calculated. In this measurement, the length of the reference section is set such that the distance $L_A$ becomes 800 mm or longer. Further, the upper limit of the distance $L_A$ is not particularly limited, however it is usually 2000 mm or less.

The ratio $L_A/L_B$ is measured twice by changing the location of the reference point 411. Then, an average value of the ratio $L_A/L_B$ from two measurements is obtained as the length ratio of the both edge portions in the width direction of the stretched film 400.

Further, it is preferable that the above-mentioned stretched film is a uniaxially stretched film. In prior art, slack that may occur at an edge portion of a stretched film was especially more prominent when the stretched film is a uniaxially stretched film. In contrast, with the stretched film produced by the manufacturing method mentioned above, even when the stretched film is a uniaxially stretched film, slack at the edge portion thereof can be suppressed. Accordingly, the advantage of suppression of the deflection at an edge portion can be remarkably enjoyed when the stretched film is a uniaxially stretched film.

Further, fluctuation of the above-mentioned orientation angle formed by the width direction of the stretched film and the slow axis is preferably 1.0° or less, more preferably 0.5° or less, particularly preferably 0.3° or less, and ideally 0°. In this description, the fluctuation of the above-mentioned orientation angle represents the difference between the maximum value and the minimum value of the above-mentioned orientation angle of the stretched film. By reducing the fluctuation of the above-mentioned orientation angle to the level described above, when a film cut out from the stretched film is used as an optical compensation film of a liquid crystal display device, the contrast of the liquid crystal display device can be improved.

The average in-plane retardation Re of the stretched film is preferably 100 nm or more, more preferably 120 nm or more, and particularly preferably 140 nm or more, and is preferably 300 nm or less, more preferably 200 nm or less, and particularly preferably 150 nm or less. By having the average in-plane retardation Re within this range, a film cut out from the stretched film can be suitably used as an optical compensation film of a display device. However, the average in-plane retardation Re of the stretched film can be optionally set to an appropriate value according to the configuration of a display device to which the film is applied.

The above-mentioned average in-plane retardation Re may be obtained by measuring the in-plane retardation at a plurality of points at intervals of 5 cm in the width direction of the film and calculating an average value of values of the in-plane retardation measured at respective points.

Fluctuation of the in-plane retardation of the stretched film is preferably 10 nm or less, more preferably 5 nm or less, particularly preferably 2 nm or less, and ideally 0 nm. In this description, the fluctuation of the in-plane retardation represents the difference between the maximum value and the minimum value of the in-plane retardation measured at any points of the stretched film. By reducing the fluctuation of the in-plane retardation of the stretched film to the level described above, when a film cut out from the stretched film is applied to a display device, an image quality of the display device can be improved.

The average NZ coefficient of the stretched film is preferably 1.08 or more, more preferably 1.09 or more, and particularly preferably 1.10 or more, and is preferably 1.3 or less and more preferably 1.20 or less. By having the average NZ coefficient within this range, a film cut out from the stretched film can be suitably used as an optical compensation film of a display device. The average NZ coefficient of the stretched film may be optionally set to an appropriate value according to the configuration of a display device to which the film is applied.

The above-mentioned average NZ coefficient may be obtained by measuring the NZ coefficient at a plurality of points at intervals of 5 cm in the width direction of the film and calculating an average value of values of the NZ coefficient measured at respective points.

Fluctuation of the NZ coefficient of the stretched film is preferably 0.1 or less, more preferably 0.07 or less, particularly preferably 0.05 or less, and ideally zero. In this description, the fluctuation of the NZ coefficient represents the difference between the maximum value and the minimum value of the NZ coefficients measured at any points of the stretched film. By reducing the fluctuation of the NZ coefficient of the stretched film to the level described above, when a film cut out from the stretched film is applied to a display device, deterioration of the display quality such as color unevenness in the display device can be prevented.

The total light transmittance of the stretched film is preferably 80% or more. The light transmittance may be measured using a spectrophotometer (manufactured by JASCO Corp., ultraviolet-visible-near-infrared spectrophotometer "V-570") according to JIS K0115.

Further, the haze of the optical film is preferably 5% or less, more preferably 3% or less, particularly preferably 1% or less, and ideally 0%. In this description, the haze may be measured in five points using a "turbidity meter NDH-300A" manufactured by Nippon Denshoku Industries Co., Ltd., according to JIS K7361-1997, and an average value thereof may be adopted.

The amount of residual volatile components contained in the stretched film is preferably 0.1% by weight or less, more preferably 0.05% by weight or less, further preferably 0.02% by weight or less, and ideally zero. By reducing the amount of the residual volatile components, size stability of the stretched film can be improved and a change with time in optical properties such as the in-plane retardation can be reduced.

In this description, the volatile components refers to a substance having a molecular weight of 200 or less, contained in the film in a very small amount, and includes, for example, a residual monomer, solvent, and the like. The amount of the volatile components may be quantified as the total amount of the substances that have a molecular weight of 200 or less and are contained in the film, by dissolving the film in chloroform and analyzing the sample using gas chromatography.

The saturated water absorption of the stretched film is preferably 0.03% by weight or less, more preferably 0.02% by weight or less, particularly preferably 0.01% by weight or less, and ideally zero. By having the saturated water absorption in the above-mentioned range, a change with time in optical properties such as the in-plane retardation can be reduced.

In this description, the saturated water absorption is a value represented by a percentage of a weight increase of a test piece of a film after soaked in water for 24 hours at 23° C. with respect to the weight of the test piece of the film before soaking.

The average thickness of the stretched film is preferably 10 μm or more, more preferably 15 μm or more, and further preferably 20 μm or more, and is preferably 100 or less, and more preferably 60 μm or less. By having this thickness, mechanical strength of the stretched film can be improved.

In this description, the average thickness of the stretched film may be obtained by measuring the thickness of the film at a plurality of points with intervals of 5 cm in the width direction of the film and calculating an average value of the thickness measured at each point.

The width of the stretched film is preferably 1300 mm or more and more preferably 1330 mm or more, and is preferably 1500 mm or less and more preferably 1490 mm or less. By having the stretched film with such a wide width, the stretched film can be applied to a large-size display device (organic EL display devices, etc.). Further, although the stretched film of prior art having the width of 1300 mm or more tends to have more significant slack at an edge portion, the stretched film produced by the manufacturing method described above can suppress slack even when it has the wide width of 1300 mm or more.

The stretched film may be used, for example, as a phase difference film and a viewing angle compensation film by itself alone or in combination with another member.

3. Polarization Plate

The stretched film described above may be used as a polarization plate in combination with a polarizer. This polarization plate includes the stretched film described above and a polarizer, and may further include an optional member as necessary.

Examples of the polarizer may include the one prepared by subjecting a film made of an appropriate vinyl alcohol-based polymer such as a polyvinyl alcohol or a partially formalized polyvinyl alcohol to appropriate processes in a proper order and by a proper method, the appropriate processes including a dyeing process using a dichroic substance such as iodine and a dichroic dye, a stretching process, a crosslinking process, and the like. Upon receiving natural incident light, such a polarizer is capable of allowing linearly polarized light to pass therethrough. It is particularly preferable that the polarizer exhibits excellent light transmittance and polarization degree. The thickness of the polarizer is generally 5 μm to 80 μm, but the thickness is not limited thereto.

The stretched film may be provided on both surfaces of the polarizer or only one surface thereof. In prior art, a protective film is provided on the surface of the polarizer, however the stretched film can play a role as a protective film for the polarizer by combining the stretched film with the polarizer. As such, the protective film that is used in prior art can be omitted from the polarization plate including the polarizing film and the polarizer in combination, and this can contribute to the thickness reduction of the polarization plate.

The polarization plate mentioned above may be produced by bonding together a long-length polarizer and a long-length stretched film by a roll-to-roll process with their lengthwise directions set in parallel to each other. An adhesive may be used for bonding them together as necessary. By using the long-length film, the long-length polarization plate can by efficiently produced.

The polarization plate may be provided with an optional member in addition to the polarizer and the stretched film. Examples of the optional member may include a protective film for protecting the polarizer. Any transparent film may be used as the protective film. Of these, a film made of a resin that is excellent in transparency, mechanical strength, heat stability, and water-shielding property is preferable. Examples of such a resin may include an acetate resin such as triacetyl cellulose, a polyester resin, a polyether sulfone resin, a polycarbonate resin, a polyamide resin, a polyimide resin, a polyolefin resin, a polymer resin having an alicyclic structure, and a (meth)acrylic resin. Of these, an acetate resin, a polymer resin having an alicyclic structure, and a (meth)acrylic resin are preferable in terms of a small birefringence, and a polymer resin having an alicyclic structure is particularly preferable from the viewpoint of transparency, low hygroscopicity, size stability, and lightweight property.

4. Display Device

A film cut out in a specific size from the above-mentioned long-length stretched film or polarization plate may be used as a component of display devices such as a liquid crystal display device and an organic electroluminescence display device. Of these, these films are preferably applied to the liquid crystal display device.

Examples of the liquid crystal display device may include the one including a liquid crystal cell driven by various modes. Examples of the driving modes of the liquid crystal cell may include an in-plane-switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

EXAMPLES

Hereinafter, the present invention will be described in details by way of Examples. However, the present invention is not limited to the Examples described below and may be optionally changed for implementation without departing from the scope of claims of the present invention and equivalents thereto.

Unless otherwise specified, operations described below were performed under the conditions of a normal temperature and a normal pressure. Further, unless otherwise specified, "%" and "part" expressing the amount in the following Examples and Comparative Examples are based on the weight.

Evaluation Methods

1. Method for Measuring Average Thickness of Film

The thickness of the film was measured at a plurality of points with intervals of 5 cm in the width direction of the film using a snap gauge ("ID-C112BS" manufactured by Mitutoyo Corp.). The average thickness of the film was obtained by calculating an average value of these measured values.

2. Method for Measuring Average In-Plane Retardation Re of Film

The in-plane retardation was measured at a plurality of points with intervals of 5 cm in the width direction of the film using a phase difference meter ("Mueller matrix polarimeter (Axo Scan)" manufactured by Opto Science, Inc.). The average in-plane retardation Re of the film was obtained by calculating an average value of values of the in-plane retardation measured at the points. The measuring wavelength was set to 590 nm in this measurement.

3. Method for Measuring Average NZ Coefficient of Film

The NZ coefficient was measured at a plurality of points with intervals of 5 cm in the width direction of the film using the phase difference meter ("Mueller matrix polarimeter (Axo Scan)" manufactured by Opto Science, Inc.). The average NZ coefficient of the film was obtained by calculating an average value of values of the NZ coefficient measured at the points. The measuring wavelength was set to 590 nm in this measurement.

4. Method for Measuring Average Orientation Angle θ of Film

The slow axis was measured at a plurality of points in the width direction of the film using the phase difference meter ("Mueller matrix polarimeter (Axo Scan)" manufactured by Opto Science, Inc.) and the orientation angle formed by the slow axis and the width direction of the film was calculated. The average orientation angle θ was obtained by calculating an average value of values of the orientation angle measured at respective points. The measuring wavelength was set to 590 nm in this measurement.

5. Method for Measuring Length Ratio of Both Edge Portions in Width Direction of Film As shown in FIG. 4, a section having a length of about 1000 mm was set to the edge 410 that, among the two edges 410 and 420 of the stretched film 400, positioned inside of the conveyance direction of the film that was bent while being stretched by the tenter device. This edge 410 corresponds to an edge closer to the end portion 42 held by the inner grippers 110L in the tenter device 100 shown FIG. 2. The stretched film 400 was linearly cut from the both end points 411 and 412 of this section along a direction within a range of 90.00°±0.01° with respect to the edge 410. With this operation, a rectangular film piece 450 formed of four sides composed of the two mutually opposing edges 410 and 420 of the stretched film 400 and two mutually opposing edges 430 and 440 appearing after cutting was obtained as a sample for measurement. Subsequently, the length $L_A$ of a side of the film piece 450 corresponding to the edge 410 and the length $L_B$ of a side corresponding to the edge 420 were measured. Then, a ratio $L_A/L_B$ of the length $L_A$ and the length $L_B$ was calculated.

The above-mentioned ratio $L_A/L_B$ was measured again at a different place 400 mm away in the lengthwise direction. Then, the average value of the ratio $L_A/L_B$ from two measurements was calculated to obtain the length ratio of the both edge portions in the width direction of the stretched film 400.

For cutting the stretched film as described above, a device capable of cutting the film with angle accuracy of 90.00°±0.03° or higher with respect to the lengthwise direction of the film was used.

Further, for measuring the side length of the film piece as the sample for measurement, a ruler and a loupe having 0.1 mm gradations or less were used.

6. Method for Evaluating Conveying Property

Conveying property of the produced stretched film was evaluated under the following criteria by visual inspection.

"A": there is neither slack nor a wrinkle.

"B": there is no wrinkle and the film can be wound in a roll shape, however there is slack.

"C": there are both slack and many wrinkles.

7. Method for Measuring Film Temperature

Measurement of the temperature of the film that was conveyed by the tenter device to pass through an oven was performed as follows.

The temperature was measured using a thermocouple in a space within the distance of 5 mm from the film passing through the inside of the oven, and this temperature was adopted as the film temperature.

Example 1

Pellets of norbornene resin ("ZEONOR1215" manufactured by ZEON CORPORATION, glass transition temperature of 126° C.) were molded by a T-die type film extruder to produce a long-length norbornene resin film having a width of 1200 mm and a thickness of 100 The film was wound in a roll shape.

As shown in FIG. 1, an apparatus 10 for manufacturing a stretched film, having a configuration described in the above-mentioned embodiment, was prepared.

The above-mentioned norbornene resin film drawn out from the feeding roll 30 was supplied as the resin film 40 to the tenter device 100 of the manufacturing apparatus 10. In the tenter device 100, the resin film 40 was stretched in a diagonal direction under the stretching conditions shown in Table 1 below to produce a pre-trim film 20. When the pre-trim film 20 was inspected near the outlet portion 140 of the tenter device 100, there was neither slack nor a wrinkle in the pre-trim film 20. Thus conveying property of the film was found to be excellent.

Further, the pre-trim film 20 was conveyed to the trimming device 300. The both end portions 21 and 22 in the width direction of the film were cut and removed by the trimming device 300 to obtain the stretched film 23 having a width of 1490 mm. This stretched film 23 was wound in a roll shape and recovered.

The stretched film 23 thus obtained was evaluated for the average thickness, the average in-plane retardation Re, the average orientation angle θ, the length ratio $L_A/L_B$ of the both edge portions in the width direction, and conveying property with the above-mentioned methods. The stretched film 23 thus obtained had the average NZ coefficient of 1.11.

Example 2

100 parts of cellulose ester (degree of substitution of acetyl groups of 2.4, total substitution degree of 2.4, glass transition temperature of 165° C.) was dissolved in a mixed solvent containing 340 parts of methylene chloride and 64 parts of ethanol to produce a dope liquid.

Next, using an endless belt casting apparatus, the above-mentioned dope liquid was cast uniformly on a stainless steel belt support body. The solvent was vaporized until the remaining solvent amount of the membranous cast dope liquid was reduced to 75% on the stainless steel belt support body to obtain a film formed of solid matter of the dope liquid. Then, the film formed of the solid matter of the dope liquid was peeled from the stainless steel belt support body and completely dried while being conveyed by a large number of rolls to obtain a long-length cellulose ester film having a width of 1000 mm. The film thickness of this cellulose ester film was 100 μm.

The cellulose ester film produced in Example 2 was used as the resin film 40. Further, the stretching conditions of the tenter device 100 were changed as shown in Table 1. A long-length stretched film was produced and evaluated in the same manner as in Example 1 except for the above-mentioned matters.

Example 3

Pellets of polycarbonate resin ("WONDERLITE PC-115" manufactured by Asahi Kasei Corp., glass transition temperature of 145° C.) was dried with a circulated hot air dryer at 70° C. for 2 hours. Subsequently, the pellets were molded by a T-die type film melt extruder having a resin melt kneader equipped with a screw of 65 mmφ diameter at a resin melting temperature of 270° C. to produce a polycarbonate resin film having a width of 1200 mm and a thickness of 100 μm.

The polycarbonate resin film produced in Example 3 was used as the resin film 40. Further, the stretching conditions of the tenter device 100 were changed as shown in Table 1. A long-length stretched film was produced and evaluated in the same manner as in Example 1 except for the above-mentioned matters.

Comparative Examples 1 to 3

Long-length stretched films were produced and evaluated in the same manner as in Example 1 except that the stretching conditions of the tenter device 100 were changed as shown in Table 1.

Results

Results of Examples and Comparative Examples mentioned above are shown in Table 1. Further, meaning of abbreviations used in Table 1 are as described below.

Tg: Glass transition temperature of resin forming resin film

COP: Norbornene resin

DAC: Cellulose ester

PC: Polycarbonate resin

Preliminary heating temperature: Film temperature at preliminary heating zone of oven Stretching temperature: Average film temperature in entire stretching zone including specific zone of oven Thermal fixing temperature: Average film temperature at thermal fixing zone of oven Reheating temperature: Average temperature of film heated in reheating zone of oven $T_L$: End portion temperature on inner gripper side of intermediate area of film in width direction of film, at specific zone $T_R$: End portion temperature on outer gripper side of intermediate area of film in width direction of film, at specific zone Re: Average in-plane retardation $L_A$: Length of side of film piece as sample for measurement corresponding to edge closer to end portion 42 held by inner grippers 110L in tenter device 100

$L_B$: Length of side of film piece as sample for measurement corresponding to edge closer to end portion 41 held by outer grippers 110R in tenter device 100

$L_A/L_B$: Length ratio of both edge portions in width direction of stretched film 300: Trimming device
310R, 310L, 320R and 320L: Trimming knife

TABLE 1

[Stretching conditions and evaluation results]

|  |  | Unit | Ex. 1 | Ex. 2 | Ex. 3 | Comp. Ex. 1 | Comp. Ex. 2 | Comp. Ex. 3 |
|---|---|---|---|---|---|---|---|---|
| Resin film | Average thickness | μm | 100 | 100 | 100 | 100 | 100 | 100 |
|  | Resin | — | COP | DAC | PC | COP | COP | COP |
|  | Tg | °C. | 126 | 165 | 145 | 126 | 126 | 126 |
| Stretching conditions | Preliminary heating temperature | °C. | 140 | 180 | 160 | 147 | 140 | 147 |
|  | Stretching temperature | °C. | 134 | 173 | 151 | 140 | 134 | 140 |
|  | Thermal fixing temperature | °C. | 129 | 166 | 146 | 132 | 129 | 132 |
|  | Reheating temperature | °C. | 138 | 174 | 151 | 120 | 138 | 120 |
|  | Stretch ratio | times | 1.7 | 2 | 1.5 | 1.7 | 1.7 | 1.7 |
|  | $T_L$ | °C. | 150 | 188 | 172 | 150 | 155 | 140 |
|  | $T_R$ | °C. | 141 | 182 | 160 | 141 | 135 | 137 |
|  | $T_L - T_R$ | °C. | 9 | 6 | 12 | 9 | 20 | 3 |
| Stretched film | Re | nm | 141 | 140 | 140 | 141 | 141 | 141 |
|  | Average thickness | μm | 58 | 50 | 48 | 58 | 58 | 58 |
|  | Average orientation angle θ | ° | 42 | 43 | 43 | 42 | 42 | 42 |
|  | Width | mm | 1490 | 1490 | 1490 | 1490 | 1490 | 1490 |
|  | $L_A$ | mm | 999.5 | 1001.3 | 999.3 | 1005.3 | 1002.5 | 1007.5 |
|  | $L_B$ | mm | 1000.2 | 999.7 | 1001.1 | 999.7 | 998.4 | 999.5 |
|  | $L_A/L_B$ | — | 0.9993 | 1.0016 | 0.9982 | 1.0056 | 1.0041 | 1.0080 |
|  | Conveying property | — | A | A | A | B | B | C |

Discussion

From Examples and Comparative Examples, mentioned above, it was confirmed that slack of the produced stretched film was successfully suppressed by combining the temperature gradient in the specific temperature range in the specific zone of the stretching zone, and the reheating in the specific temperature range in the reheating zone.

DESCRIPTION OF NUMERALS

10: Manufacturing apparatus
20: Pre-trim film
21 and 22: End portion in width direction of pre-trim film
23: Stretched film (intermediate area of pre-trim film)
30: Feeding roll
40: Resin film
41 and 42: End portion in width direction of resin film
43: Intermediate area of resin film
100: Tenter device
110R and 110L: Gripper
120R and 120L: Guide rail
130: Inlet portion of tenter device
140: Outlet portion of tenter device
200: Oven
210: Preliminary heating zone
220: Stretching zone
221: Specific zone
230: Thermal fixing zone
240: Reheating zone
250: Partition wall
330: Conveyance roll
400: Stretched film
410 and 420: Edge in width direction of stretched film
411 and 412: End point of section set on the edge
421 and 422: Vertex of film piece
430 and 440: Edge of film piece
450: Film piece

The invention claimed is:

1. A method for manufacturing a stretched film for producing a long-length stretched film having a slow axis in an angle of 5° or more and 85° or less on average with respect to a width direction thereof by stretching a long-length resin film while being conveyed so as to pass through an oven in a state in which each of both end portions of the resin film are held by first grippers and second grippers that are capable of holding the end portions of the resin film, wherein:
the oven has a preliminary heating zone, a stretching zone, a thermal fixing zone, and a reheating zone in this order from an upstream side;
the stretching zone includes a specific zone having a temperature gradient capable of setting a temperature of an intermediate area such that a temperature of an end portion on a second gripper side therein is higher than a temperature of an end portion on a first gripper side therein by 5° C. or higher and 15° C. or lower, the intermediate area being an area of the resin film in the width direction excluding the both end portions thereof; and
the reheating zone has a temperature capable of heating the resin film to a temperature of Tg+5° C. or higher and Tg+20° C. or lower, Tg representing a glass transition temperature of a resin forming the resin film, the manufacturing method comprising:

a step of holding the both end portions of the resin film by the first grippers and the second grippers;

a step of passing the resin film through the preliminary heating zone;

a step of passing the resin film through the stretching zone such that a moving distance of the first grippers is longer than a moving distance of the second grippers;

a step of passing the resin film through the thermal fixing zone; and a step of passing the resin film through the reheating zone.

2. The method for manufacturing a stretched film according to claim 1, wherein a stretch ratio is 1.1 times or more and 3.0 times or less.

3. The method for manufacturing a stretched film according to claim 1, wherein, in the intermediate area of the resin film in the specific zone, the temperature of the end portion on the first gripper side and the temperature of the end portion on the second gripper side are both Tg+13° C. or higher and Tg+30° C. or lower.

4. The method for manufacturing a stretched film according to claim 1, wherein the stretched film has the slow axis in an angle of 40° or more and 50° or less on average with respect to the width direction of the stretched film.

5. The method for manufacturing a stretched film according to claim 1, wherein a width of the stretched film is 1300 mm or more and 1500 mm or less.

6. The method for manufacturing a stretched film according to claim 1, wherein a thickness of the stretched film is 10 μm or more and 100 μm or less.

7. The method for manufacturing a stretched film according to claim 1, wherein the stretched film is made of a thermoplastic resin.

8. A long-length stretched film produced by the manufacturing method according to claim 1.

9. The long-length stretched film according to claim 8, wherein an average NZ coefficient is 1.08 to 1.3, wherein NZ coefficient is a value represented by (nx−nz)/(nx−ny) where nx represents a refractive index in a direction which gives a maximum refractive index among directions perpendicular to a thickness direction of the film (in-plane direction), ny represents a refractive index in an in-plane direction perpendicular to the direction of nx, and nz represents a refractive index in the thickness direction of the film.

10. The long-length stretched film according to claim 8, wherein the long-length stretched film is a uniaxially stretched film.

* * * * *